March 18, 1958 M. BRUMA ET AL 2,827,595
DEVICE FOR MACHINING, BY MEANS OF ELECTRIC SPARKS, PIECES
MADE OF ELECTRICITY CONDUCTING MATERIALS
Filed July 1, 1954 2 Sheets-Sheet 1

INVENTOR
Marc Bruma
Michel Magat
BY
Bailey, Stephens & Huettig
ATTORNEYS

United States Patent Office 2,827,595
Patented Mar. 18, 1958

2,827,595

DEVICE FOR MACHINING, BY MEANS OF ELECTRIC SPARKS, PIECES MADE OF ELECTRICITY CONDUCTING MATERIALS

Marc Bruma, Pavillons-sous-Bois, and Michel Magat, Bourg-la-Reine, France, assignors to Centre National de la Recherche Scientifique, Paris, France, a society of France Application July 1, 1954, Serial No. 440,806

Claims priority, application France December 21, 1953

9 Claims. (Cl. 315—180)

The present invention relates to devices for machining, by means of electric sparks pieces made of electricity conducting materials, that is to say devices making use of electric erosion to machine any piece of a metal or a metallic alloy which is a conductor of electricity, irrespective of the hardness of this metal or alloy, and by means of tools constituted by metals or alloys of a hardness substantially lower than that of said pieces, for instance tools made of copper or copper alloys.

The chief object of our invention is to provide a device of this kind which is better adapted to meet the requirements of practice than those used for the same purposes up to the present time.

According to our invention, in devices of this kind, we insert between the source of current and the spark forming system (that is to say the system constituted by the electrode acting as a tool and the piece to be machined), at least two capacitors connected in such manner with said source that at least one of them is always opposing the direct flow of a short-circuit active current between said source and the spark formed between the electrode and the piece. In particular, said capacitors are connected in series and connected with the source in such manner as to be successively charged by it.

Preferred embodiments of the present invention will be hereinafter described with reference to the accompanying drawings, given merely by way of example, and in which.

In known devices of the type above referred to, the circuits generally include a capacitor which serves to accumulate the electric energy necessary to supply the spark which is formed between the electrode acting as a tool and the piece to be machined, said electrode and said piece being directly connected with the terminals of the capacitor respectively. On the other hand, the source of electrical energy is directly connected in shunt across said capacitor whereby the spark discharge is supplied by two currents, one coming from the energy stored up in said capacitor and the other, called short-circuit current, which comes directly from the source. This last mentioned current has a detrimental effect on the operation of the device because, as it tends to be maintained permanently, it causes the formation of arcs between the electrode and the piece. Now, on the one hand, this deforms the tool and deteriorates the superficial state of the piece by local heating and melting and, on the other hand, this is dangerous for the source itself. The insertion in the circuit of a current limiting resistor makes it possible to reduce these drawbacks (and this merely to a limited degree) only by introducing other disadvantages.

Our invention makes it possible to obviate these drawbacks by making use of means such that the generator or source of electrical energy cannot be directly connected with the discharge circuit portion constituted by the electrode and the piece.

For this purpose, our device includes at least two capacitors suitably connected with the source of electrical energy, for instance through current flow controlling tubes or equivalent means, said capacitors being in particular connected in series and successively charged, so that a direct connection between the source and the spark discharge circuit portion permitting the flow of an active current is always made impossible owing to the presence of at least one of said two capacitors which opposes such a short-circuit.

It should be will understood that the spark discharges might be obtained—either directly by means of said capacitors, or from an accumulator system interposed between said capacitors and the circuit portion including the electrode and the piece; this accumulator system may be constituted by at least one capacitor, a delay network, etc.

Figure 1:
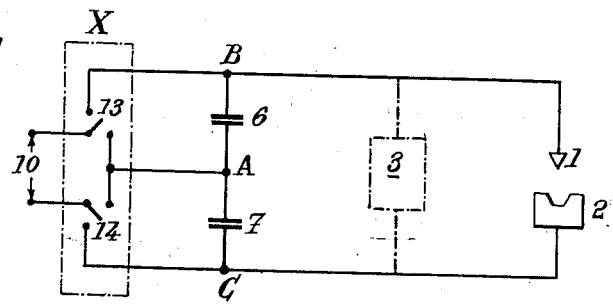
Fig. 1 is a diagrammatical view of a first embodiment of our invention.

Fig. 1 shows a simple embodiment of our invention.

According to this embodiment, a source 10 (which may be either a direct current or an alternating current source) charges with a constant polarity, through suitable means, two capacitors 6, 7 connected in series, the end terminals B and C of this system of capacitors being themselves connected with the terminals of the discharge portion of the circuit which includes the electrode 1 and the piece 2. The means through which the source charges the capacitors may consist of rectifying means or of vibrating contacts or, as shown by Fig. 1, of rotary contacts 13, 14 the conductor segments of which rotate with respect to fixed contacts.

Figure 2:
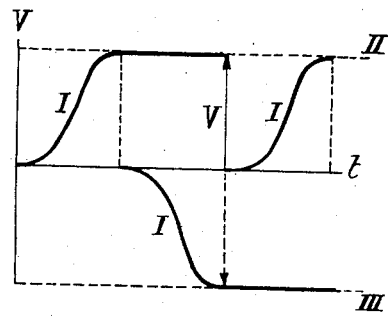
Fig. 2 is a curve showing the variation of voltage as a function of time, in a device according to Fig. 1.

In the construction of Fig. 1, source 10, which is supposed to be a direct current source, is connected through contacts 13 and 14 successively with the terminals AB and AC of capacitors 6 and 7, which are therefore successively charged. The charge curves are shown at I on Fig. 2, on either side of the axis of abscissas, on which times are plotted. If the distance between the electrode and the piece is suitably chosen, the spark discharge takes place under a voltage V which is the sum of the two charge voltages of the capacitors, after which one of these capacitors is again charged and so on.

It will be seen that any direct short-circuit between the source and the spark discharge circuit portion is impossible. As a matter of fact, supposing for instance that contacts 13, 14 are connected with A and C, that is to say to capacitor 7, at the time of the discharge, it will be seen that the other capacitor (in this case capacitor 6) opposes the flow of a direct current between the source and the spark discharge circuit portion.

Of course, the device may further include a charge accumulator system such as shown in dotted lines at 3 (capacitor, delay network, etc.). It should be well understood that the system surrounded by dotted lines X is only diagrammatically illustrated and might include any equivalent feed and switching means. For instance, contacts 13 and 14 might be electronic tubes the switching of which would be controlled through any suitable means. We might also include in the charge circuit resistors, self-inductance coils and the like, which are not absolutely necessary to the operation of the device but may be useful in some cases.

Figure 3:
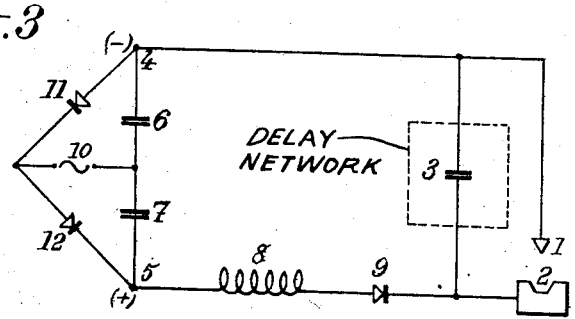
Figs. 3 and 4 show, similarly to Figs. 1 and 2, a second embodiment of our invention.

According to the construction of Fig. 3, the two capacitors are charged by an alternating current source one of the terminals of which is connected to the middle point between the capacitors and the other terminal of which is connected to the two other armatures of said capacitors through unidirectional transmission means respectively mounted in opposite directions, whereby each of said capacitors, in this case also, is alternately charged by the source in the course of two successive half-periods.

On said Fig. 3, electrode 1 and piece 2 are connected with the terminals of the energy accumulation means 3 which may be a capacitor, or preferably a delay network. Said terminals are themselves connected with the terminals 4 and 5 of the system of capacitors 6 and 7 mounted in series. However, between the lower terminal of capacitor 3, which is connected with the piece 2, and terminal 5 it is advantageous, although not necessary, to interpose a self-inductance coil 8 which constitutes a charge impedance and a unidirectional connecting element 9 which prevents the formation of a transitory wave across the terminals of system 3.

Capacitors 6 and 7 are preferably identical to each other and they are for instance successively charged by source 10 through the two unidirectional or rectifying elements 11 and 12. If $V_{eff}$ is the effective voltage of said source, said capacitors are each charged at a voltage close to $V_{eff}\sqrt{2}$, whereby between the terminals 4 and 5 there is a voltage of constant polarity but of wave form, the maximum value of which does not exceed $2\sqrt{2}V_{eff}$ and the mean value of which, account being taken of the voltage drops through the rectifiers 11 and 12, is close to $1.5\sqrt{2}V_{eff}$.

Figure 4:
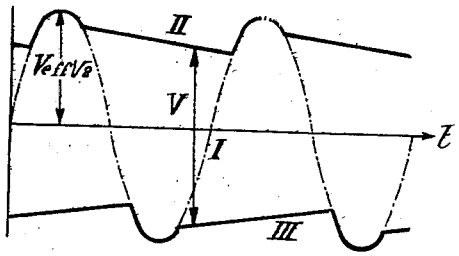

Fig. 4 shows the variations of voltage that are obtained. If curve I, partly in dotted lines, shows the voltage variations of source 10 as a function of time $t$ plotted in abscissas, curve II in solid lines shows the variations of voltage across the terminals of capacitor 6, the ordinates of this curve being above the axis of abscissas, and curve III in solid lines shows the variations of voltage across the terminals of capacitor 7, the ordinates of this curve being below the axis of abscissas. It follows that the value of voltage V across terminals 4 and 5 is given by the distance between curves II and III (of course without taking account of the reaction of the load constituted by the spark discharge circuit portion). It may be calculated that, for practical purposes, the delay network is loaded to a maximum voltage averaging $1.8 \times 1.5\sqrt{2}V_{eff}$, that is to say $3.8V_{eff}$, then discharges quickly in the form of sparks in the dielectric fluid that is chosen.

The frequency of discharges $f$ is practically given, in kilocycles, by the expression $f=1/\pi\sqrt{LC}$, L designating the value of self-inductance coil 8 in millihenrys and C the value of the capacity of means 3 in microfarads.

With the lay-out of Fig. 3, as with that of Fig. 1, there is practically no longer any short-circuit current because it is suppressed by the reactances of capacitors 6 and 7, and of self-inductance coil 8, this without any dissipation of energy and without slowing down the rate of the discharges, therefore without imposing any limitation upon the speed of machining.

In the lay-out of Fig. 3, unidirectional elements 11 and 12 may be constituted at will either by dry rectifiers (copper, selenium, germanium, etc.,) or by vacuum valves or valves containing metallic vapours (mercury, caesium, lithium, etc.). Also it has been supposed that the source is an alternative one, for instance a rotary generator.

Still by way of example, it may be indicated that an electric erosion machining device according to the present invention and corresponding to the lay-out of Fig. 3 had the following characteristics:

Source 10: a single phase alternator having a frequency of 2500 periods. Voltage 250 volts. Power 1.2 kilowatts. Internal self-inductance: 1 microhenry.

Valves 9, 11 and 12 of the rare gas type (xenon).

Capacitors 6 and 7: each 4 microfarads, this value being chosen so as to comply with the relation:

$$(2\pi f)^2 LC = 1$$

with, for frequency $f$ and internal self-inductance L, the above mentioned values.

Self-inductance 8: 1 microhenry.

Accumulation element 3: delay network of the "open circuit" type, of a total capacity of 8 microfarads, and of a characteristic impedance of 0.05 ohm.

Figure 5:
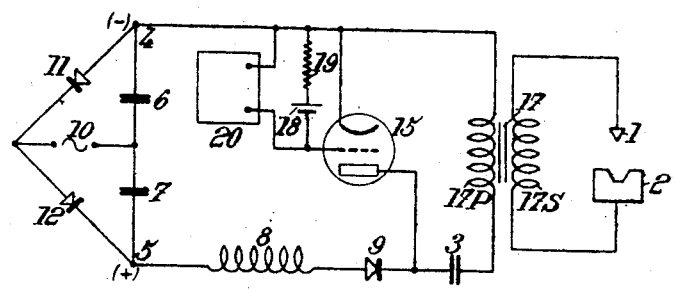
Figs. 5 and 6 show modifications of the device according to our invention.
Figure 6:
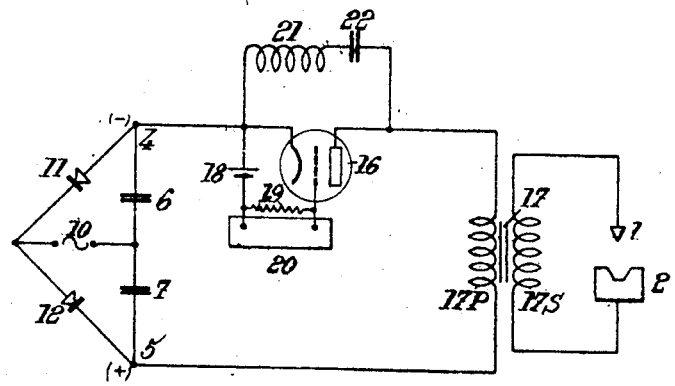

Figs. 5 and 6 show two among many possible modifications of the invention.

These modifications, which are particularly advantageous, include in particular the combination of a transformer 17 and switching means such as 15, 16 cooperating with the whole so as to adjust the working frequency with a high degree of adaptability, said switching means being for instance piloted by an auxiliary voltage wave, an arrangement which may be advantageous when it is necessary to cut off high intensities.

On Fig. 5, a switch 15 cooperating with transformer 17, interposed between the charge circuit portion and the discharge circuit portion, and mounted in shunt across the primary of said transformer, is for instance constituted by an electronic tube which may be of the high vacuum type (three electrode tube). In this lay-out, the current impulse which creates the spark and passes through the primary 17P of transformer 17 results from the sudden discharge of capacitor (or delay network) 3 through electronic tube 15. The latter then acts as a switch because its control grid, maintained by a suitable bias 18 and through a resistance 19 at a cut off voltage, periodically receives voltage impulses from a generator 20 which every time make tube 15 conductive. At this time the accumulator means 3 discharge. The time interval between two successive actions of tube 15 must be at least equal to the time of charge of means 3 through coil 8 and primary 17P. If L is the self-inductance of the circuit charging means 3, C its capacity, the switching frequency must be $f_c = 1/\pi\sqrt{LC}$. It is of course possible to dispense with coil 8 provided that the transformer has a sufficient self-inductance.

In the lay-out of Fig. 6 there is provided a switch 16 in series with the primary of the transformer, this switch being for instance of the electronic type capable of delivering a high current, for instance a tube of the so-called thyratron type. According to the values applied to the control grid of said switch, this element works in a fashion analogous to that of tube 15, that is to say either stops current or allows it to flow. The switching frequency must be the same as above. However, if tube 16 is a thyratron, it is necessary to provide at the terminals thereof a circuit including a self-inductance coil 21 and a capacitor 22 because, with this kind of tube, the grid 1 ceases to have any action upon the plate current once this current has been started. Capacitor 22 then charges, through self-inductance coil 21, to a voltage substantially twice that existing across the terminals 4—5 to discharge in an oscillating manner into tube 16 once this tube has itself been started. The plate voltage may become zero and even negative due to the oscillation thus created, and at this time the grid can reassume control. The auxiliary generator 20 may be eliminated provided that bias 18 is given a value such that tube 16 starts operating only for a voltage substantially twice that across terminals 4—5. In these conditions, the frequency of the current oscillations in primary 17P, and therefore that of the spark discharges, will be $f_c = 1/\pi\sqrt{L'C'}$, L' being the self-inductance of coil 21, and C' the capacity of capacitor 22.

It should be noted that with this lay-out it is possible to dispense with means 3 and to use the secondary 17S as means for accumulating energy. The device thus obtained is such that the means for accumulating energy which discharges between the electrode and the piece to produce the machining sparks is an inductive reactance, an arrangement which also constitutes a feature of the present invention.

Whatever be the embodiment that is chosen, our invention makes it possible to eliminate arcs between the electrode and the piece to be machined. The short-circuit current may be eliminated without using for this purpose the insertion of an energy dissipating element.

The devices according to our invention make it possible to obtain high machining speeds, and also surfaces the roughness of which is lower than that obtained, for the same speed of machining, with the devices known at the present time. It is known that to reduce roughness it is necessary to eliminate arcs, a result which is obtained with the devices according to our invention. On the other hand, it is known that a good surface finish requires the use of energy accumulator means having a low capacity, and the machining is the quicker as the capacity of these means is higher.

With the devices according to our invention, it is possible to use high frequencies with low capacities for said accumulator means, which makes it possible to obtain both a good surface finish and a high rate of machining.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A device for machining by means of electric sparks a piece made of an electricity conducting material which comprises, in combination, an electrode located at spark distance from said piece, two capacitors, an electric circuit including said piece, said electrode and said two capacitors, an alternating current source having one of its terminals connected with the respective terminals of said two capacitors which are directly connected together, and current rectifying means interposed between the other terminal of said source and the other terminalss of said capacitors respectively, said rectifying means being mounted in opposed directions respectively, starting from said last mentioned source terminal, whereby said capacitors are charged separately and successively by said source to prevent short-circuit active current from flowing directly from said source to the circuit portion formed by said electrode and said piece.

2. A device for machining by means of electric sparks a piece made of an electricity conducting material which comprises, in combination, an electrode located at spark distance from said piece, two capacitors, an electric circuit including said piece, said electrode and said two capacitors, an alternating current source having one of its terminals connected with the respective terminals of said two capacitors which are directly connected together, current rectifying means interposed between the other terminal of said source and the other terminals of said capacitors respectively, said rectifying means being mounted in opposed directions respectively, starting from said last mentioned source terminal, whereby said capacitors are charged separately and successively by said source to prevent short-circuit active current from flowing directly from said source to the circuit portion formed by said electrode and said piece, and energy accumulating means interposed in said circuit across the terminals of said last mentioned circuit portion.

3. A device according to claim 2 in which said accumulating means consist of a capacitor.

4. A device according to claim 2 in which said accumulating means consist of a delay network.

5. A device for machining by means of electric sparks a piece made of an electricity conducting material which comprises, in combination, an electrode located at spark distance from said piece, a transformer including a primary and a secondary, a secondary electric circuit including said piece, said electrode and said transformer secondary, two capacitors, a primary electric circuit including in series said two capacitors and said transformer primary, an alternating current source having one of its terminals connected with the respective terminals of said two capacitors which are directly connected together, current rectifying means interposed between the other terminal of said source and the other terminals of said capacitors respectively, said rectifying means being mounted in opposed directions respectively, starting from said last mentioned source terminal, whereby said capacitors are charged separately and successively by said source to prevent short-circuit active current from flowing directly from said source to said primary transformer, and a periodical cut-off device interposed between said capacitors and said transformer primary.

6. A device according to claim 5 in which said cut-off device is an electronic one and is controlled by a periodical voltage.

7. A device according to claim 5 in which said cut-off device is in shunt with said transformer primary.

8. A device according to claim 5 in which said cut-off device is in series with said transformer primary and said capacitors.

9. A device according to claim 5 in which said transformer primary is arranged to act inductively as energy accumulating means.

References Cited in the file of this patent

UNITED STATES PATENTS

| | | |
|---|---|---|
| 1,123,118 | De Forest | Dec. 29, 1914 |
| 1,655,636 | Smith | Jan. 10, 1928 |
| 1,703,688 | Niemann | Feb. 26, 1929 |
| 1,972,279 | Tarzian | Sept. 4, 1934 |
| 2,030,228 | Randolph et al. | Feb. 11, 1936 |
| 2,072,278 | Schade | Mar. 2, 1937 |
| 2,179,791 | Kock | Nov. 14, 1939 |
| 2,235,385 | Rava | Mar. 18, 1941 |
| 2,472,115 | Mayer | June 7, 1949 |
| 2,628,330 | Williams | Feb. 10, 1953 |

OTHER REFERENCES

Harding et al.: Arc Machining Makes Hard-To-Cut Jobs Easy, American Machinist, March 3, 1952.

Alden: Electrospark Machining, Mechanical Engineering, September 1953, pp. 701–705.